Feb. 12, 1952          G. E. SNYDER          2,585,594
ADJUSTABLE GENERATING V-BLOCK
Filed Dec. 9, 1946          2 SHEETS—SHEET 1
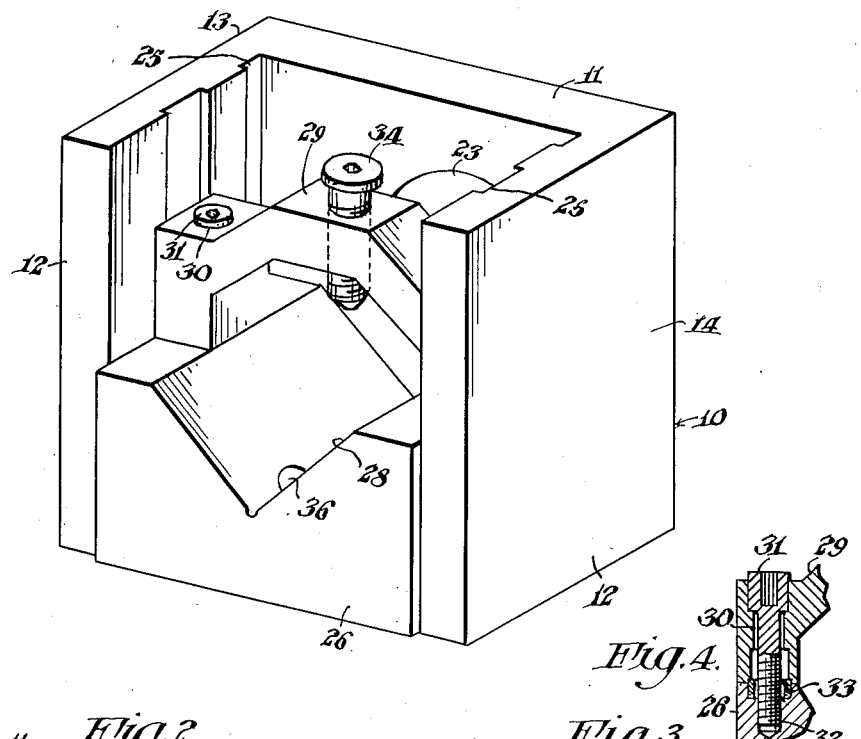
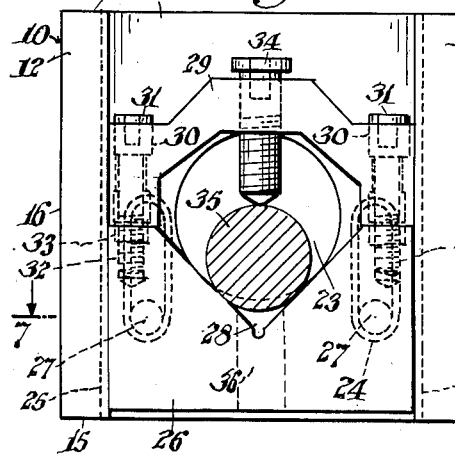
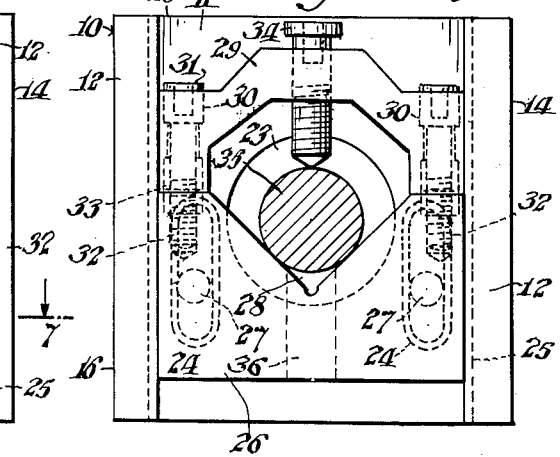
Inventor
George E. Snyder,
By W. W. Williamson
Attorney.

Feb. 12, 1952       G. E. SNYDER       2,585,594
ADJUSTABLE GENERATING V-BLOCK
Filed Dec. 9, 1946                    2 SHEETS—SHEET 2
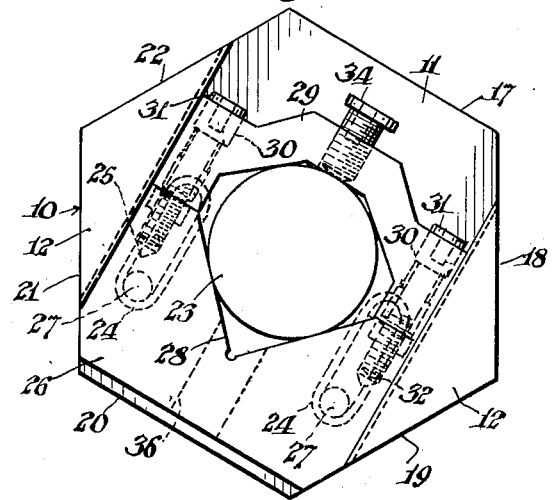
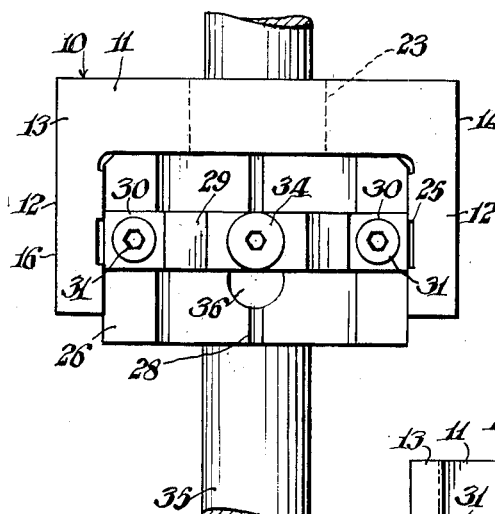
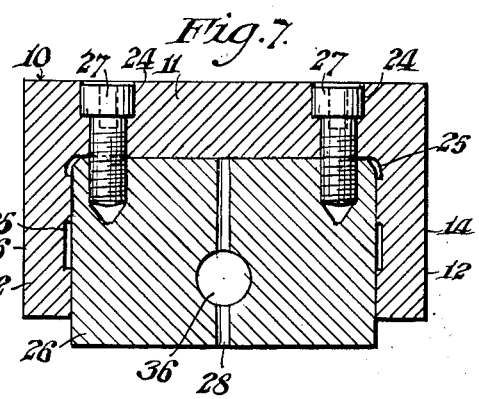
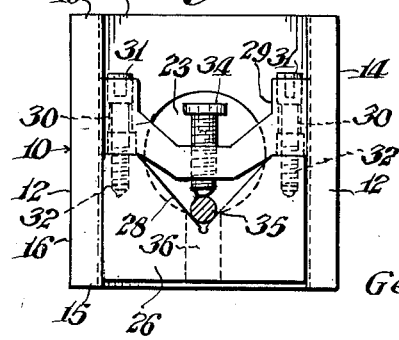
Inventor
George E. Snyder,
By W. W. Williamson
Attorney.

Patented Feb. 12, 1952

2,585,594

UNITED STATES PATENT OFFICE 2,585,594

ADJUSTABLE GENERATING V-BLOCK

George E. Snyder, Philadelphia, Pa.

Application December 9, 1946, Serial No. 714,986

8 Claims. (Cl. 90—59)

My invention relates to a new and useful adjustable generating V-block and has for one of its objects to provide a device of this character including a symmetrical holding unit in which a V-block unit is adjustably mounted for centering the latter relative to the sides of said holding unit.

Another object of the invention is to provide an adjustable generating V-block in which a work-piece may be firmly clamped, then adjusted to a central location and to provide a generating assembly for carrying out the necessary machine operations without the necessity of changing the position of the work-piece with relation to the V-block assembly.

Usually when it is desired to accomplish more than one operation on a work-piece in a milling machine, surface grinder, shaper or the like, it is necessary to adjust the work-piece before each and every operation. The use of V-blocks of kinds other than described herein requires considerable time and labor and entails the risk of error in subsequent adjustments resulting in work spoilage. These disadvantages are entirely overcome by the use of the present invention because when the work-piece is clamped in the V-block unit, said work-piece is automatically centered relative to certain parts of the holding unit and by adjusting said V-block unit until the work-piece is centered relative to other parts of the holding unit, said work-piece will be centered relative to all flat exterior side surfaces of the holding unit. Thereafter, the apparatus with the work-piece therein has only to be turned to various desired angular positions to accomplish all of the required work operations. Therefore another object of this invention is to provide a simple and effective adjustable generating V-block that insures accurate work and requires but one initial measuring operation.

A further object of the invention is to provide an adjustable generating V-block for holding a round work-piece, in particular, centrally of a number of exterior flat sides of the apparatus which may be rotated to a number of different positions in a machine so that a plurality of flat faces may be formed on said work-piece in a uniform manner and all equi-distant from the axial center of said work-piece.

A still further object of the present invention is to provide a device of the kind mentioned including a channel-shaped holding unit of symmetrical polygonal exterior configuration with a V-block unit slidable in said channel and fixable in any adjusted relation to said holding unit.

With the above and other objects in view this invention consists of the details of construction and combination of elements hereinafter set forth and then designated by the claims.

In order that those skilled in the art to which this invention appertains may understand how to make and use the same I will describe its construction in detail referring by numerals to the accompanying drawing forming a part hereof in which:

Fig. 1 is a perspective view of one form of adjustable generating V-block constructed in accordance with my invention.

Fig. 2 is front elevation of the apparatus with a work-piece mounted therein and the V-block unit in a random location relative to the holding unit prior to adjustment.

Fig. 3 is a similar view after adjustment with the work-piece centered relative to the sides of the holding unit.

Fig. 4 is a fragmentary detail section of the V-block unit illustrating one method of connecting the actual V-block and its cross-piece.

Fig. 5 is a front elevation of the adjustable generating V-block of slightly different configuration.

Fig. 6 is a top side view of the complete apparatus.

Fig. 7 is a section on the line 7—7 of Fig. 2.

Fig. 8 is a front view of the device shown in Figs. 2 and 3 with the cross-piece inverted for holding very small work-pieces.

In carrying out my invention as herein embodied 10 represents the holding unit of channel shape including a back wall or web 11 and a pair of parallel forwardly projecting toes or flanges 12. This holding unit is fashioned to provide a symmetrical structure of three or more flat sides all equi-distant from an axis through the back wall 11. For purpose of illustration only, one form of the device, particularly the holding unit thereof, is shown as having four equal sides 13, 14, 15 and 16 while another form, Fig. 5, is shown as having six equal sides 17, 18, 19, 20, 21 and 22.

Through the back wall 11 is formed a hole 23 the center of which is in the axis of holding unit 10. Slots 24 are also formed through the back wall longitudinally of the channel or in planes parallel to the inner surfaces of the flanges 12.

The inner surfaces of the holding unit 10 are finished or ground smooth and are absolutely parallel with and at right angles to some of the sides. All or only certain of the inner surfaces may have grooves 25 therein to reduce the area of the surfaces which have to be finished.

Within the channel recess of the holding unit 10 is mounted a V-block unit 26 which engages the finished inner surfaces and is slidable longitudinally of said channel recess. To hold the V-block unit 26 in any adjusted position, within the limits of the slots 24, socket type screws 27 are projected through the slots 24 and threaded into the V-block unit. By screwing the screws 27 inward the V-block unit will be drawn against the inner surface of the back wall of the holding unit and thereby clamp said V-block unit against the holding unit.

The V-notch 28 is formed in the inner face of the V-block unit and extends forwardly from the back of the V-block structure as a whole. A detachable cross-piece 29 is provided as a part of the V-block unit and in each arm thereof is formed a hole 30 having counter bores at both ends, Fig. 4. Socket type screws 31 are mounted in the holes 30 and screwed into the threaded holes 32 in the V-block, which holes 32 are counter bored to receive the wear collars or bushings 33. The cross-piece 29 can be used with the arch outward, as in Figs. 1 to 7, or projecting inwardly, as depicted in Fig. 8. The latter position is utilized when very small work is to be clamped in the V-block unit.

A socket head set screw 34 is threaded through the cross-piece 29 midway of its ends for engagement with a work-piece 35 and by adjusting said set screw with the arch of the cross-piece outward various large sized work-pieces may be clamped in place.

As the operations on the work-piece often are related to some other work, such as a punch and die, the work-piece may have a detent at a particular location in the circumference thereof. In order to set the work-piece, a locator or finder, in the form of a rod, is used, which locator is projected through a hole 36 in the V-block extending from the base angle of the V-block 28 to the base of the V-block midway the sides of the latter.

Referring particularly to Figs. 2 and 3 it will be apparent that as soon as the work-piece 35 is clamped in the V-block unit said work-piece will be centered relative to the sides 14 and 16 regardless of the position of the V-block unit relative to the sides 13 and 15. As shown in Fig. 2 the work-piece is central between the sides 14 and 16 but not between sides 13 and 15. A measurement is taken of the distance between either side 14 or 16 and the adjacent portion of the circumference of the work-piece, then the V-block unit is adjusted until the distance between either side 13 or 15 and the adjacent portion of the circumference of the work-piece is the same as the measurement taken at one of the sides 14 or 16. The work-piece is now centered relative to all of the sides 13, 14, 15 and 16 and the screws 27 are tightened to firmly hold the V-block unit in the adjusted position as shown in Fig. 3.

The position of the V-block unit in the holding unit as illustrated in Fig. 2 is exaggerated unless the work-piece is rather short because it cannot be projected through the hole 23 in the back wall or web 11 of the holding unit 10. Ordinarily the V-block unit would be adjusted to some random position that would permit the work-piece to extend through the hole 23 rather than clamp the work-piece in place for the measurements and afterwards release, and then reclamp said work-piece in the V-block unit after projecting the work-piece through the hole 23. The apparatus with the work-piece in position may now be set on a machine bed or placed in the supporting elements of a machine and the work operations carried out.

As an example, the device may be placed on one of its sides, for instance, the side 15 and a flat formed on the work-piece. Then by generating the apparatus, successively or otherwise to the other sides 16, 13 and 14, the other desired flats may be formed on the work-piece. When finished all of the flats will be even and equi-distant from the axial center of the work-piece.

With some other configuration such, for instance, as a six sided device illustrated in Fig. 5, the work-piece is clamped in the V-block unit while the latter is in some random position at the center of the holding unit. Then by adjusting the V-block unit longitudinally of the channel until the distances from the opposite sides 17 and 20 to the adjacent portions of the circumference of the work-piece are equal, said work-piece will be centrally located relative to all of the sides. Thereafter, the apparatus with the work-piece therein is generated or rotated, step by step, from one flat to another and each operation accomplished while the device is resting on one of the sides. When the work is completed, the finished product will have flats that are all the same and equi-distant from the axial center of the work-piece.

While I have described the generating V-block as used in a machine for performing work on an article, said generating V-block can be employed as a holder for a work-piece on a work bench for laying-out purposes as will be readily understood.

Of course I do not wish to be limited to the exact details of construction herein shown and described as these may be varied within the scope of the appended claims without departing from the spirit of the invention.

Having described the invention what I claim as new and useful is:

1. In an adjustable generating V-block, a plural sided holding unit having a channel with its longitudinal center equi-distant from at least two opposite locations on the border of said holding unit, and a V-block unit to support a work-piece slidably mounted in said channel whereby when said work-piece is carried to a position midway the length of said channel due to adjustment of the V-block unit the said work-piece will be equi-distant from all of the sides of the holding unit.

2. The structure of claim 1 wherein the holding unit has a hole in the back thereof through which the work-piece may be projected.

3. The structure of claim 1, in combination with means to hold the V-block unit in any adjusted position.

4. The structure of claim 1 wherein the V-block unit has a locating hole running from the base of the V-block to the base angle of the V recess.

5. An adjustable generating V-block consisting of a channel holding unit of polygonal outline providing a plurality of flat sides two of which are equi-distant from the longitudinal center of said channel and all of said sides equi-distant from the axial center of the holding unit, and means in said channel to support a work-piece and automatically position it midway between the two sides which are equi-distant from the longitudinal center of the channel, said means being slidably adjustable in the channel to locate the work-piece equi-distant from the remaining sides at which time said work-piece will be central of all sides.

6. An adjustable generating V-block consisting of a channel holding unit of symmetrical polygonal outline providing a plurality of corresponding flat sides two of which are equi-distant from the longitudinal center of said channel and all of said sides equi-distant from the axial center of the hodling unit, said holding unit including a back wall and flanges the inner surfaces of which are smooth finished and the back wall having a work-piece receiving opening and slots communicating with the channel recess and said slots extending longitudinally of said channel, a V-block unit mounted in the channel to support a work-piece and automatically position it midway between the two sides which are equi-distant from the longitudinal center of the channel, said V-block unit being slidably adjustable in the channel to locate the work-piece equi-distant from the remaining sides of the holding unit at which time said work-piece will be central of all sides, and screws projected through the slots and threaded into the V-block unit for retaining the latter in any adjusted position.

7. The structure of claim 6 wherein the V-block unit has a locating hole therein communicating with the base of the V-block proper and the base angle of the recess in said V-block.

8. In a device of the kind described, the combination of an adjustable generating V-block including a holding unit of polygonal outline providing a plurality of flat sides and having a channel, two of said flat sides being equi-distant from the longitudinal center of said channel and all of said sides being equi-distant from the axial center of the holding unit, a V-block unit provided with a V recess and slidably mounted in the channel, a work-piece having a detent in its surface clamped in said V-block unit, means to adjustably fasten the V-block unit within the channel whereby the center of said work-piece is held in the axial center of the holding unit, and a locator removably projecting through a hole running from the base of the V-block to the adjacent base angle of the V recess and into the detent in the surface of the work-piece for centering the latter.

GEORGE E. SNYDER.

REFERENCES CITED

The following references are of record in the file of this patent:

UNITED STATES PATENTS

| Number | Name | Date |
|---|---|---|
| 989,005 | Hanson | Apr. 11, 1911 |
| 1,257,475 | Gapp | Feb. 26, 1918 |
| 1,262,405 | Sutherland | Apr. 9, 1918 |
| 1,535,570 | Bryant | Apr. 28, 1925 |
| 2,240,688 | Conner | May 6, 1941 |
| 2,356,591 | Jesionowski | Aug. 22, 1944 |
| 2,422,773 | Colwill | June 24, 1947 |
| 2,449,459 | Eckert | Sept. 14, 1948 |